United States Patent [19]

Scholin

[11] 4,108,447
[45] Aug. 22, 1978

[54] SHAFT SEAL

[76] Inventor: Harold W. Scholin, 1125 N. Northwest Hwy., Park Ridge, Ill. 60068

[21] Appl. No.: 823,999

[22] Filed: Aug. 12, 1977

[51] Int. Cl.² .............................................. F16J 15/32
[52] U.S. Cl. .................................. 277/153; 277/164; 277/216
[58] Field of Search ........................ 277/9, 9.5, 10, 11, 277/47–50, 149, 152, 153, 157, 163, 164, 165, 206 R, 212 R, 212 C, 212 F, 212 FB, 216

[56] References Cited

U.S. PATENT DOCUMENTS

| 2,162,104 | 6/1939 | Mosher | 277/153 |
| 2,445,882 | 7/1948 | House | 277/152 |
| 2,736,586 | 2/1956 | Riesing | 277/153 |
| 2,768,849 | 10/1956 | Riesing | 277/153 |
| 2,799,532 | 7/1957 | Smart | 277/152 X |
| 2,830,858 | 4/1958 | Moorman et al. | 277/153 X |
| 2,833,577 | 5/1958 | Reynolds | 277/153 X |
| 2,977,139 | 3/1961 | Primeau | 277/153 |
| 3,156,474 | 11/1964 | Nelson | 277/153 X |
| 3,252,342 | 5/1966 | Collins | 277/152 X |
| 3,380,745 | 4/1968 | Kudlaty | 277/152 |

FOREIGN PATENT DOCUMENTS

| 1,371,175 | 7/1964 | France | 277/153 |
| 623,835 | 5/1949 | United Kingdom | 277/153 |
| 712,847 | 8/1954 | United Kingdom | 277/153 |

Primary Examiner—Robert S. Ward, Jr.
Attorney, Agent, or Firm—Emrich, Root, O'Keeffe & Lee

[57] ABSTRACT

A shaft seal adapted to be inserted into the bore of a housing and around a shaft therein is disclosed, wherein an annular elastomeric sealing ring is molded to provide an annular sealing lip around the inner diameter thereof, and an annular groove extending inwardly from one surface thereof in an axial direction. A separate and removable spring ring in the groove expands the seal outwardly against the wall of the bore, and a garter spring in the groove compresses the sealing lip against the shaft. If desired, a reinforcing ring may also be positioned in the groove between the bottom thereof and an end of the spring ring.

1 Claim, 4 Drawing Figures

SHAFT SEAL

BACKGROUND OF THE INVENTION

Shaft seals are relatively new devices within the past 40 or 50 years, and in the early days lubrication was mostly in the form of splash lubrication with the oil dripping off of the parts into a sump. In automotive usages, in such early days, a felt ring was placed into a housing groove to keep the crank case oil from draining into the transmission.

As engines and other devices developed higher speeds, the problem of containing the oil became increasingly difficult. Some of the early shaft seals were made of leather wherein the manufacturer would cut a leather washer and clamp the outer diameter thereof in a metal casing. The inner diameter of the washer was cut to a diameter somewhat smaller than that of the shaft projecting through it. When the seal was installed, the metal casing was so dimensioned as to provide an interference fit in the bore of the housing, and the leather washer was so dimensioned as to provide an interference fit with the rotating shaft.

On occasion, such leather washer was sometimes supported by finger springs to give added sealing ability. The leather washer was eventually replaced by synthetic washers, from a cost view point. Later, the knife edge type of configuration for the sealing surface was developed as shown in many of the prior art patents of which I am aware such as, for example, Woodling U.S. Pat. No. 3,489,420 and Procter U.S. Pat. No. 2,316,713.

With the advent of the molded lip, a garter spring was installed to increase the sealng ability of this type of seal. In each and every case, however, of which I am aware the seal is press fitted into the bore of the housing sometimes with a metal shell with or without a rubber covering, but in all cases the rubber was bonded in some manner to the metal and this is a difficult and expensive process.

The expense involved in preparation of the metal shell and the processing and handling during the molding process is quite high. The metal must be inserted into a mold one at a time, which in itself is time consuming. The rubber compound must then be inserted into the mold, and the entire assembly molded under heat and pressure for a considerably time period. Removing the parts is difficult because the metal shells expand, due to heat. The tolerances on the shells must be held very close in order that they be able to fit metal bores without leakage while being used. The seal of the present invention is less costly because no metal insert is being handled during the molding process.

The present invention is designed to overcome the problems attendant with those seals wherein rubber is bonded to metal, both from the standpoint of expense and ease of assembling in the bore of the housing and around the shaft.

BRIEF SUMMARY OF THE INVENTION

The present invention relates generally to shaft seals and is particularly directed to such a seal which is molded entirely of an elastomeric material. The inner diameter thereof has the V-lip design and the garter spring for lip retention, but without the metal casing.

The invention includes further the use of a spring ring, preferably formed of spring steel, which is a separate and distinct item from the seal itself, and which is inserted into an annular groove extending inwardly in an axial direction from one face of the seal. The spring ring has the surfaces thereof extending in an axial direction, so that it will expand outwardly in the annular groove and cause the outer surface of the seal to be yieldably urged into sealing engagement with the surface of the bore within the housing.

In some applications, it may be desirable to add a reinforcing ring member which may also be inserted in the aforesaid annular groove in the bottom thereof and between the bottom and the spring ring. The surfaces of such reinforcing ring extend preferably in a radial direction.

This seal design has numerous advantages over those heretofore known in the prior art such as, for example, being less expensive to produce because there would be no process of molded rubber to metal involved. The separate spring ring would be less costly to manufacture and more easily inserted and assembled with the seal. The tolerances and finishes of the housing bore can be less critical, making the manufacture of machine parts less expensive.

It is therefore a principle object of the present invention to provide a shaft seal which is less expensive and easier to assemble than those heretofore known.

Other and more specific objects of the invention will appear more fully as the description proceeds, reference being had to the accompanying drawings.

DETAILED DESCRIPTION OF A PREFERRED FORM OF THE INVENTION

Figure 1:
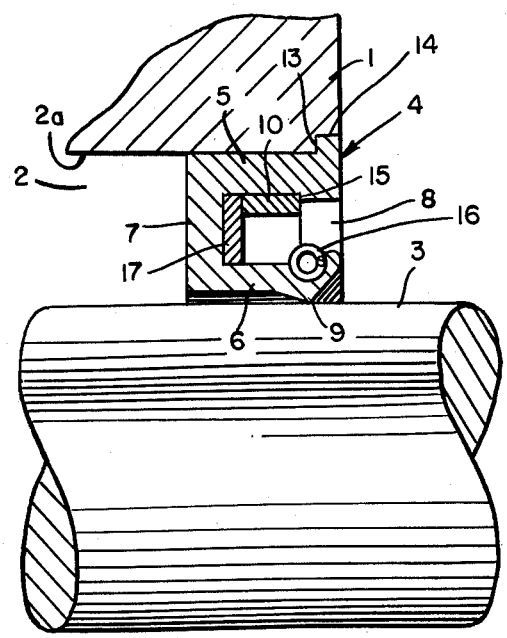
FIG. 1 is a sectional view through one form of shaft seal taken along an axial plane showing the shaft in elevation and the housing in section, with one form of a bore therethrough.

Referring now more particularly to the drawings and especially to FIG. 1, there is illustrated a portion of a housing indicated by the numeral 1, having a bore 2 therethrough, the wall of the bore being indicated by the numeral 2a. A shaft 3 is received within the bore of the housing, and a shaft seal, generally indicated by the numeral 4, is inserted into the bore 2 between the wall 2a and the shaft 3.

The shaft seal 4, in this preferred form of the invention, has a generally U-shaped configuration in cross-section with the outer leg of the U extending in an axial direction and indicated by the numeral 5. The inner leg of the U is indicated by the numeral 6, and these two spaced apart legs are connected by the base member 7 extending in a radial direction.

Between the legs 5 and 6 there is provided an annular groove 8 which extends inwardly from one face of the seal, thereby providing the legs of the U-shape. An annular sealing lip 9 is formed around the inner periphery of the ring and has a diameter which is slightly smaller than the diameter of the shaft 3 so as to be in sealing contact therewith.

Figure 3:
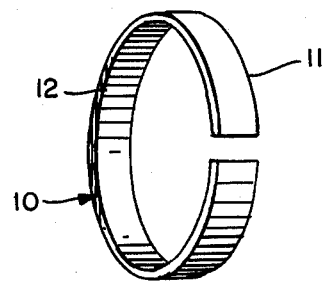
FIG. 3 is a perspective view of the split spring ring which may be compressed and inserted into a groove in the seal and expanded outwardly when released.

A spring ring 10, preferably formed of spring steel, has the outer and inner surfaces 11 and 12 thereof extending in an axial direction (FIG. 3), and is adapted to be inserted into the annular groove 8. As may be seen in FIG. 3, the spring ring is split to provide a gap between the ends thereof, thereby enabling the ring to be compressed and inserted into the annular groove 8, and then released so that it will spring outwardly and urge the outer surface of the shaft seal against the wall 2a of the housing 4.

The bore 2 of the housing in which the shaft is located, as well as the shaft seal, may assume different specific configurations. In FIG. 1, for example, the bore is provided with an annular shoulder 13 at the outer end thereof, resulting in an annular recess of larger diameter than the bore, which receives the outwardly extending annular flange 14 around the outer surface of the seal.

The outer peripheral edge of the flange 14 will be urged against the wall of this recess, and the remainder of the outer surface of the seal will be urged outwardly against the wall 2a of the bore when the spring ring 10 is inserted, thereby providing a seal to prevent leakage of oil past the outer periphery of the shaft seal.

The outer surface of the annular groove 8 is also offset at a predetermined distance inwardly from the outer face thereof to provide the annular shoulder 15. This shoulder is for the purpose of retaining the spring ring 10 within the annular groove. If the size and use to which the seal is to be put is such that it is not necessary to provide a stiffening member, then the axial width of the spring ring 10 may be such as to extend all the way from the shoulder 15 to the bottom of the annular groove 8.

The garter spring 16 may then be placed within the annular groove 8 in a suitable annular recess therein opposite the sealing lip 9, so that inward pressure against the sealing lip will be exerted to place the lip in sealing engagement with the shaft 3.

Figure 4:
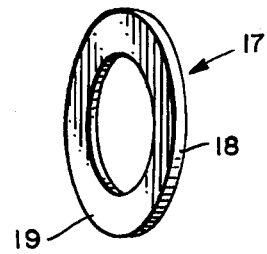
FIG. 4 is a perspective veiw of a reinforcing ring which may be used in association with the shaft seal of the present invention under certain circumstances.

In the event that the structural height of the seal is sufficient to cause a lateral movement of the sealing lip 9, a back-up or reinforcing ring, such as that shown at 17, may be used to make the assembly more rigid. As may be seen in FIG. 4, this reinforcing ring 17 has the faces 18 and 19 thereof extending radially of the shaft. FIG. 1 shows the ring 17 in its assembled relation with the other elements of the combination wherein it is inserted in the bottom of the anular groove 8. In this arrangement, then, the spring ring 10 will extend inwardly of the groove 8 from the shoulder 15 to the reinforcing ring 17. Thus, the ring 17 will be located between the bottom of the groove 8 and the edge of the ring 10.

In this arrangement, the housing bore will be sealed against leakage by the outer diameter of the elastomeric seal. Neither the outer diameter of the seal nor the inner diameter of the bore will require close tolerance or a fine finish. In applications where the reinforcing ring 17 is used, this is also a separate and distinct member of the combination, so that none of the metal parts will be molded to the elastomeric seal, thereby considerably decreasing the cost of manufacture as well as increasing the ease of assembly.

Figure 2:
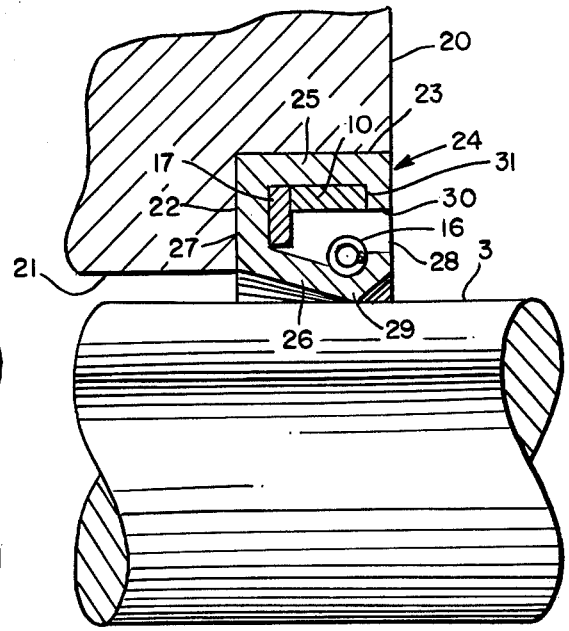
FIG. 2 is a view similar to FIG. 1 but showing a modified form of sealing ring to accommodate a different form of bore through the housing.

FIG. 2 shows generally the same combintion of elements, but in this case the bore of the housing has a somewhat different cross-sectional configuration. In FIG. 2 the housing is indicated by the numeral 20 and is provided with a bore which has the wall 21 thereof provided with a shoulder 22 and a second wall of larger diameter indicated at 23. The shaft seal is indicated generally by the numeral 24 and has an axial dimension which is substantially equal to the axial dimension of the annular wall 23. Thus, the seal 24 may be received within the bore of the housing so that the outer annular surface of the seal will bear against the annular wall 23, and the inner radially extending side of the seal will abut against the shoulder 22.

Again, the shaft seal has a generally U-shaped configuration in cross-section wherein one leg of the U is at the outer peripheral edge of the seal as shown at 25. The inner leg of the U is shown at 26 and is preferably inclined outwardly and inwardly toward the shaft 3. The two legs are connected by the annular radially extending bottom portion 27, so that there will be provided the annular groove 28 extending inwardly from one surface of the seal and between the inner and outer legs 26 and 25 respectively, of the U.

The inclination of the inner leg 26 provides the annular sealing lip 29 which has a diameter slightly smaller than the diameter of the shaft 3. A similar garter spring 16 may be utilized in the annular recess within the groove 8 to urge the sealing lip 29 inwardly aganst the surface of the shaft 3 for sealing engagement therewith.

The spring ring 10 may be inserted in the annular groove 28 in the same way as heretofore described, but in this particular instance there will be provided on the outer face of the seal an inwardly extending annular flange 30, thereby providing the shoulder 31 against which the outer edge of the spring ring 10 may abut.

In this case the spring ring will again expand outwardly to urge the outer surface of the sealing ring against the surface 23 of the bore into sealng engagement therewith. If desired, the reinforcing ring 17 may also be used as shown in FIG. 2, and when this is assembled with the other elements of the combination, it will be positioned against the bottom of the groove 28 and between the bottom and one edge of the spring ring 10 as shown.

In both of the configurations of the shaft seal, the same advantages are present, namely, the lack of any molding of elastomeric material to metal, and the lack of any metal to metal contact as between the seal and the wall of the bore. Since all of these parts may be assembled by hand and no molding operation with respect to the metal is necessary, the entire seal may be manufactured and assembled much more economically than those heretofore known, and will operate more effectively to provide efficient seals both with respect to the wall of the bore and the surface of the shaft. The fact that the bore need not be machined to close tolerances, as is the case where the elastomeric material is molded to a metal shell, results in further savings in time and money.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

I claim:
1. A shaft seal assembly adapted to be inserted into the bore of a housing and around a shaft therein comprising,
   (a) an annular molded elastomeric sealing member having an annular sealing lip on the inner diameter thereof adapted to be in sealing engagement with a shaft in said bore,

(b) the surface of the outer diameter of said sealing member being in engagement with the inner surface of the bore in which it is located,
(c) an annular recess in said sealing member extending inwardly in an axial direction from one side of said member,
(d) spring means in said recess adapted to yieldingly urge said sealing lip into sealing engagement with the shaft,
(e) a separate and removable reinforcing ring member having the surfaces thereof extending in a radial direction and positioned against the bottom of said annular recess in unsecured relation to said sealing member, and
(f) a separate and removable split spring ring member, substantially rectangular in cross-section, positioned in said annular recess outwardly of said reinforcing ring member, and adapted to yieldingly urge the surface of the outer diameter of said sealing member into sealing engagement with the inner surface of the bore, the inner surface of said split spring ring member bearing against said reinforcing ring to hold said reinforcing ring in place and prevent outward movement thereof.

* * * * *